US012282759B1

United States Patent
Vanga et al.

(10) Patent No.: US 12,282,759 B1
(45) Date of Patent: Apr. 22, 2025

(54) DISTRIBUTED DATA PROCESSING AND MACHINE LEARNING WORKLOAD SCALING

(71) Applicant: o9Solutions, Inc., Dallas, TX (US)

(72) Inventors: Srinath Goud Vanga, San Jose, CA (US); Gautham K. Kudva, Flower Mound, TX (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 18/903,570

(22) Filed: Oct. 1, 2024

(51) Int. Cl.
*G06F 9/50* (2006.01)
*G06F 8/60* (2018.01)
*G06F 9/445* (2018.01)
*G06F 9/455* (2018.01)
*G06F 9/48* (2006.01)
*H04L 29/06* (2006.01)

(52) U.S. Cl.
CPC ............ *G06F 8/60* (2013.01); *G06F 9/44526* (2013.01)

(58) Field of Classification Search
CPC ...... G06F 8/60; G06F 9/44526; G06F 16/182; G06F 9/5072; G06F 9/45558; G06F 8/71; G06F 8/63; G06F 21/6218; H04L 67/1008; H04L 67/1097; H04L 67/10
See application file for complete search history.

(56) References Cited

U.S. PATENT DOCUMENTS

| 10,193,963 B2 * | 1/2019 | Gummaraju .......... G06F 16/182 |
| 11,720,382 B2 * | 8/2023 | Beard ................. G06F 9/45558 718/1 |

\* cited by examiner

*Primary Examiner* — Thuy Dao
(74) *Attorney, Agent, or Firm* — Schwegman Lundberg & Woessner, P.A.

(57) ABSTRACT

Systems and techniques may generally be used for streamlining a deployment and scaling of data processing and machine learning workloads on a distributed system. An example method may include receiving, from a user at a user interface, a plugin command, an input including a name key and a query, and a driver code including a code package. The method may include filtering the query based on a scope of the plugin command, obtaining input data by querying an input measure group, and slicing the obtained input data into one or more slices based on the slicing key. The method may include determining a number of containers to be used, and assigning at least one slice for each container. The method may include executing at each container the respective assigned at least one slice, generating an output for each input, and storing each output at a respective output measure group.

21 Claims, 5 Drawing Sheets

DISTRIBUTED DATA PROCESSING AND MACHINE LEARNING WORKLOAD SCALING

TECHNICAL FIELD

The systems and techniques described herein relate to a framework that streamlines deployment and scaling of data processing and machine learning workloads on distributed systems.

BACKGROUND

Data scientists and data engineers deal with several complexities in scaling big data sets (e.g., retail data sets, or the like) for data processing and machine learning. In order to process big data in distributed systems, a user (e.g., data scientist, data engineer, or the like) needs to have an in-depth technical knowledge of distributed systems to ensure efficient computer resources usage, compatibility of new versions of code with existing data and services, strict access controls to protect sensitive data and services, effective communication among cross-functional teams, or the like.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
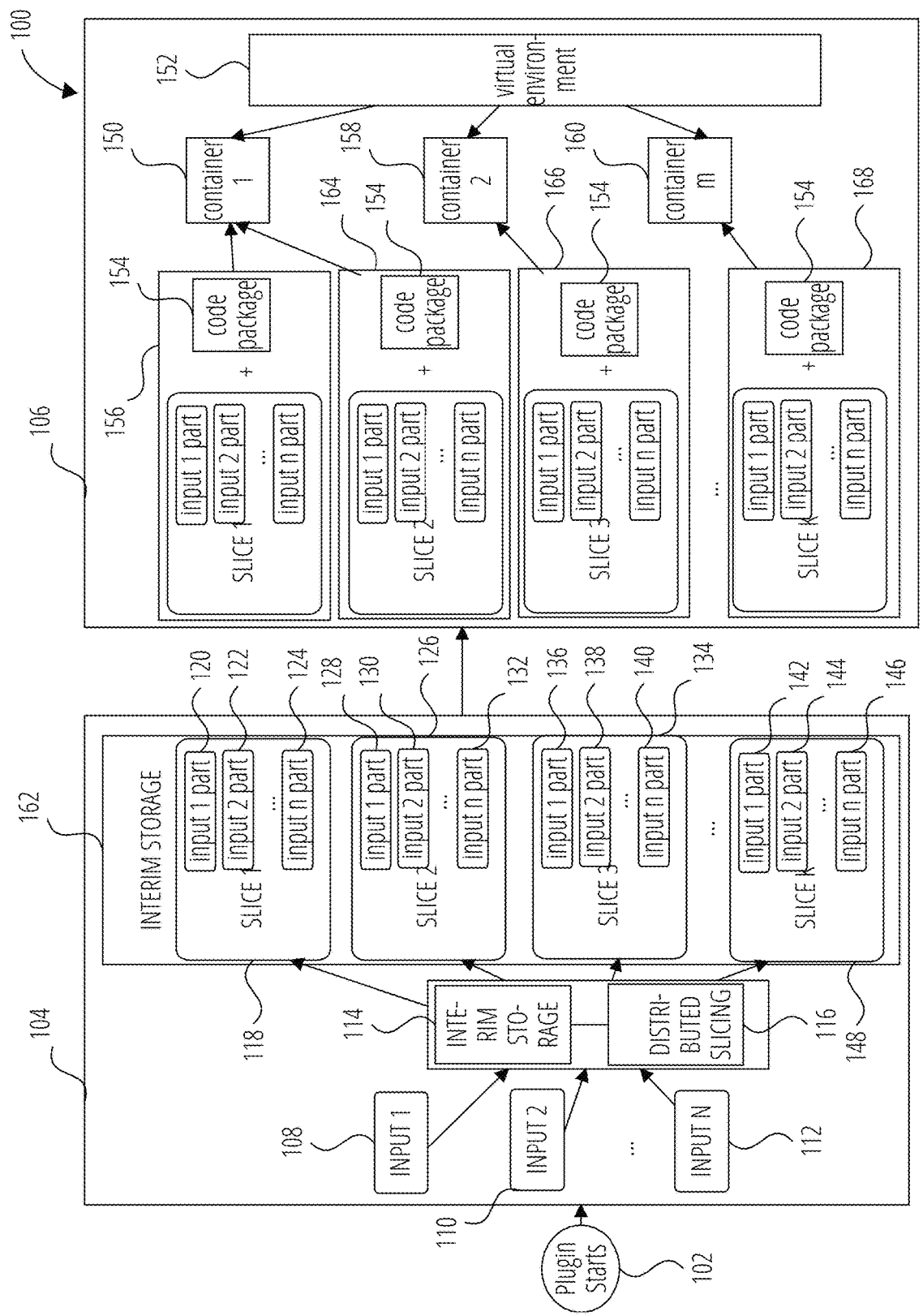
FIG. 1 illustrates a framework for streamlining a deployment and scaling of data processing and machine learning workloads on a distributed system, according to some examples.

The systems and techniques described herein include a framework that streamlines deployment and scaling of data processing and machine learning workloads on distributed systems. The framework may be used on systems having a star schema for data storage. The framework improves the parallel processing of various data entities through a user-friendly configuration interface and an innovative slice key data partitioning mechanism.

The systems and techniques described herein enable users of the framework with limited expertise in distributed systems to manage large-scale datasets efficiently. The framework seamlessly integrates with machine learning libraries, offers real-time monitoring, and provides advanced error handling, all while ensuring optimal infrastructure configuration to elevate workflow performance and reliability.

The framework may include a user-friendly configuration graphical user interface (GUI) that simplifies setting up workflows by allowing users to input data through name keys. The GUI may incorporate intelligent design elements (e.g., autocompletion, validation checks, or the like) to ensure accuracy and case of use.

The user may build machine learning models and data processing code for deployment (e.g., running daily, running several times a day, or the like). In an example, the user may process data in scale (e.g., a billion rows of data to process, or the like), which will require a distributed processing (e.g., computer cluster, or the like) due to random access memory (RAM) and central processing unit (CPU) limitations in a single computing device. The systems and techniques described herein teach a framework that improves the deployment of code at scale without having to write a specific code to do so.

In an example, the framework uses a slice key mechanism, which partitions data into independent slices for efficient distribution across a computing cluster. A computer cluster is a set of machines that may run programming code (e.g., Python code package, or the like) in parallel when dealing with large data sets (i.e., data sets too large to fit into a main memory or RAM of a single computer). The user easily controls the granularity of parallelism and workload distribution through simple modifications of the slice key, employing sophisticated partitioning methods to optimize data allocation.

The slice key mechanism is a technique used to access a subset of elements from a data structure (e.g., a list, a string, a tuple, or the like). In the context of data analysis and manipulation, data slicing refers to the process of extracting a subset of data from a larger dataset based on dimensions and attributes of the dimensions. This concept is often used in data science, database management, and programming to focus on specific portions of data for analysis or processing.

Utilizing a single program multiple data (SPMD) paradigm, the framework may be designed to execute a single program for different data slices. This approach allows for the automatic handling of execution, data distribution, and artifact collation for each data slice, thus abstracting the complexity of parallel processing from the user.

In an example, each data slice is provisioned with scratch space and persistent storage, managed by the framework to ensure security and proper maintenance. Temporary scratch space is used for intermediate computations, while persistent storage retains data for future use, with the system providing appropriate data cleanup and security protocols.

The framework may include a scoped run feature that enables the user to conduct tests on subsets of data without reconfiguring an existing setup. The scoped run feature allows the user to validate workflows before scaling the workflows up to complete datasets.

The systems and techniques described herein may use a framework including a GUI that decouples the business logic from the technical part and the infrastructure part so the user does not have to know what happens underneath. The GUI allows the user to configure the framework to run the user code on a computer cluster (e.g., a set of machines that may run a code in parallel, or the like).

The framework may abstract the complexities of distributed systems by segregating code, data, and infrastructure layers, which provides the user with greater control and portability. The segregation of code, data, and infrastructure layers allows the user to concentrate on workflow logic without the need to delve into the technical details of the underlying infrastructure.

The framework may use a declarative input configuration in which the user inserts a key (e.g., a name key, or the like) and a query. The query gets executed every time the framework runs a plugin and the query data will be available to the user within the code (e.g., data frame, or the like). The user does not need to query for data every time running the plugin, the framework obtains the query data for the user automatically. In an example, a data science team uses sales data for forecasting models, and a data engineering team makes the sales data available. The science data team does not want to care about how the data engineering team is processing the sales data and where the sales data is stored. The framework may act as an intermediary between the data engineering team and the data science team. The data engineering team may store the sales data in a location accessible to the framework, so when the data scientist team may access the sales data through the framework without knowing where the sales data is stored.

The data engineering team may change the location of the sales data and update the framework configuration without impacting the workflows of the data science team. The systems and techniques described herein decouple teams and improve interoperation between different teams by allowing each team to work independently without interfering with the workflow of the other teams.

The framework may include an access control layer (ACL) controlled by an administrator. The administrator may setup the ACL to control the data access of each user of the framework.

The framework, when in autopilot mode, may automatically deploy an infrastructure configuration (e.g., a configuration for processing data efficiently and optimizing computational resources use, or the like) based on specific data volume and computational demands. The framework, when in a solution mode, may suggest to the administrator of the framework an infrastructure configuration based on specific data volume and computational demands. The suggestion is not made to the end user but to whoever is running the framework in the background. The infrastructure configuration may be the number of nodes in the computer cluster to be used. The feature of automatically deploying the infrastructure configuration or suggesting the infrastructure configuration to the administrator is particularly beneficial for a user lacking in-depth technical knowledge of distributed systems.

The framework may streamline integration with machine learning libraries, enabling efficient scaling of machine learning workloads. This integration ensures the user (e.g., data scientists, or the like) can train and deploy models across distributed systems with minimal configuration effort.

Furthermore, the framework may be equipped with real-time monitoring and logging functionalities that offer transparency into processing tasks to the user, enabling the user to identify and address bottlenecks and issues proactively. The user may be provided with accessible interfaces for logging and monitoring, which support informed decision-making and oversight of workflow progress.

Lastly, robust error handling and recovery mechanisms may be embedded in the framework (e.g., automatic retries and failover strategies that work in tandem to preserve data integrity and ensure workflow continuity in the face of processing failures, or the like).

The framework may integrate intelligent configuration interfaces, sophisticated data partitioning, SPMD execution, robust error handling, seamless machine learning library integration, and real-time monitoring, which significantly simplifies the complexities of managing workflows in distributed systems, ensuring accuracy, efficiency, and ease of use for the user across various environments.

FIG. 1 illustrates a framework 100 for streamlining deployment and scaling of data processing and machine learning workloads on distributed systems, according to some examples. The framework 100 includes a plugin start element 102, a first stage 104, and a second stage 106.

Initially, the plugin may start to run at plugin start element 102. A user may execute the plugin via an exec plugin command at plugin start element 102, as the exemplary command shown below.

---

EXEC plugin instance [DP020SystemFeatureWeight] for measures {[Sales]} using scope ([Version].[Version Name].[CurrentWorkingView] * [Item].[Item].[ABC]).

---

In an example, the above command executes the plugin DP020SystemFeature Weight for a single item ABC. In an example, the user may change the scope statement of the exec plugin command (e.g., the same plugin can be executed for another scope). The same plugin may be executed for multiple different views of the data without changing the plugin configuration.

The framework 100 may receive one or more inputs (e.g., input 108, input 110, input 112, or the like). The user may add a configuration to the framework 100 including a pair of an identification key (key ID) and a key value (e.g., a query, or the like) for each input. For example, an input related to sales data may include a identification key as "sales" with a key value as a query that selects relevant columns of sales data at a storage source The user may provide a query that selects a relevant measure or dimension (e.g., Select ([Version].[Version Name].[Current Working View]*[Item].[Item]) on row, ({Measure.[RCA measure]}) on column). In an example, the user provides a query that selects a measure group as the key value. The user may provide a query that selects a measure group as the key value when a storage type is a file system. The framework 100 executes the query every time the user runs the plugin and retrieves the query data for use as a DataFrame.

In the first stage 104, the framework 100 may gather all the required input data queries (e.g., input 108, input 110, input 112, or the like) and filters based on the scope (e.g., ABC, or the like) provided in the command. The framework 100 may obtain data for each input by querying a respective storage source for each input (e.g., a measure group, or the like). The framework 100 may store the obtained data at an interim storage 114.

In an example, in the first stage 104, the framework 100 uses a slice key mechanism, which partitions data into independent slices for efficient distribution across a computing cluster. A computer cluster is a set of machines that may run programming code in parallel when dealing with large data sets (i.e., data sets too large to fit into a computer's main memory or RAM). The user easily controls the granularity of parallelism and workload distribution through simple modifications of the slice key, employing sophisticated partitioning methods to optimize data allocation.

Utilizing the single program multiple data (SPMD) paradigm, the framework 100 may be designed to execute a single program for different data slices. This approach allows for the automatic handling of execution, data distribution, and artifact collation for each data slice, thus abstracting the complexity of parallel processing from the user.

In an example, each data slice is provisioned with scratch space and persistent storage, managed by the framework to ensure security and proper maintenance. Temporary scratch space is used for intermediate computations, while persistent storage retains data for future use, with the system providing appropriate data cleanup and security protocols.

The framework 100 may apply a slicing function to each input based on a slicing key. A slicing function is a mechanism for organizing a set of n inputs ("nodes") into k slices ("groups"), such that each input learns the index of the slice to which it belongs. A "slicing key" typically refers to a key or attribute used to segment or filter data within a dataset in slices (e.g., slice 118, slice 126, slice 134, slice 148, or the like). The slicing key includes a set of one or more dimensions (e.g., time, product, geography, customer, or the like) and an attribute for each dimension (e.g., product category, product brand, product category, product ID, product name, story unit, city, state, county, year, quarter, month, day, customer demographics, customer segments, customer ID, customer name, or the like). In an example, the slicing key attribute is a specific field or variable within a slicing key dimension. A slicing key dimension is a broader category that contains multiple attributes and represents a specific aspect of the data that can be sliced for analysis.

In an example, each dimension includes a slice attribute, and there is no restriction that all input tables should reference all slice dimensions. For example, the slice key may be a brand, in which case the number of slice keys executed is as many as the number of brands. In another example, the slice key may be a brand plus a store, and adding a store will increase the number of executed slice keys to as many as the number of unique combinations of brands and stores. The user may select different slicing keys for slicing the one or more inputs. The slice key represents the unit of work selected by the user.

The framework 100 may apply a distributed slicing 116 to each input based on the slicing key provided by the user. Distributed slicing 116 may include a technique for dividing a large dataset (e.g., across multiple machines or nodes) into smaller, manageable slices that can be processed in parallel across a distributed system (e.g., a computer cluster). This approach improves performance, scalability, and resource utilization.

In an example, for each input including at least one attribute of a dimension of the provided slicing key (e.g., 120, 122, 124, 128, 130, 132, 136, 138, 140, 142, 144, 146, or the like), the distributed slicing 116 is performed. On the other hand, for each input not including an attribute of one dimension of the provided slicing key, the distributed slicing 116 is not performed. After the slicing, the slice data (e.g., slice 118, slice 126, slice 134, slice 148, or the like) may be stored in a second interim storage (e.g., interim storage 162, or the like).

In the second stage 106, the user may select a number of containers (e.g., a virtual container, or the like) for the framework 100. The framework 100 may automatically select a number of containers based on the cluster configuration, available resources on the cluster, the number of slices, or the like. In an example, the user can override the automatically selected number of containers by specifying the number of virtual containers in the plugin command.

A container (e.g., container 150, container 158, container 160, or the like) may be a lightweight, standalone, and executable software package that includes everything needed to run an application (e.g., a Python application, or the like), such as the code, runtime, libraries, and dependencies. Each container may operate independently, allowing isolated execution of different slices. The user may scale specific slices by adding more containers to handle increased load.

In framework 100, each container (e.g., container 150, container 158, container 160, or the like) is assigned one or more slices (e.g., container 150 is assigned slice 156 and slice 164, container 158 is assigned slice 166, container 160 is assigned slice 168, or the like) for execution, and it executes them in serial isolation from other containers.

A code package (e.g., 154, or the like) and a driver code (e.g., inserted at 216 in FIG. 2, or the like), along with a virtual environment 152, are used across all containers. In an example, the code package 154 is a bundle of code files and related resources (e.g., a Python module, or the like) that are organized and distributed together for the purpose of reuse, deployment, or distribution. The code package 154 may be written and uploaded by the user into the framework 100. The driver code (e.g., inserted at 216, or the like) is the entry point into the plugin and runs as many times as the number of slices. The driver code (e.g., inserted at 216, or the like) may be provided by the user within a text block of a plugin configuration. The code package 154 may be referenced within the driver code. In an example, to run a plugin (e.g., a Python program, or the like), the framework 100 requires one or more libraries (e.g., one or more standard Python libraries, or the like) used by the driver code or the code package 154 (e.g., numerical Python (NumPy), TensorFlow, or the like). The virtual environment 152 may include the one or more libraries required for running the plugin. The user may select the virtual environment 152 from one of the standard environments provided by the framework 100. The user may create a custom environment for the virtual environment 152 by uploading a list of libraries. In an example, the framework 100 automatically generates the virtual environment 152 based on the uploaded list of libraries. The user may include the name of the environment in their exec plugin command mentioned above.

Once all containers finish executing the respective assigned slices, outputs (e.g., 218, 220, 222, or the like) are collated and stored back into an original storage (e.g., a respective measure group). Outputs may declare the schema, which may be used to validate when the outputs are collated and stored back into the original storage. The inputs are measures from one or more input measure groups. The outputs are measures from one or more output measure groups. Each measure group can have a respective storage mechanism. The user may change the storage mechanism of an input measure group or of an output measure group without changing the plugin driver code or code package.

Figure 2:
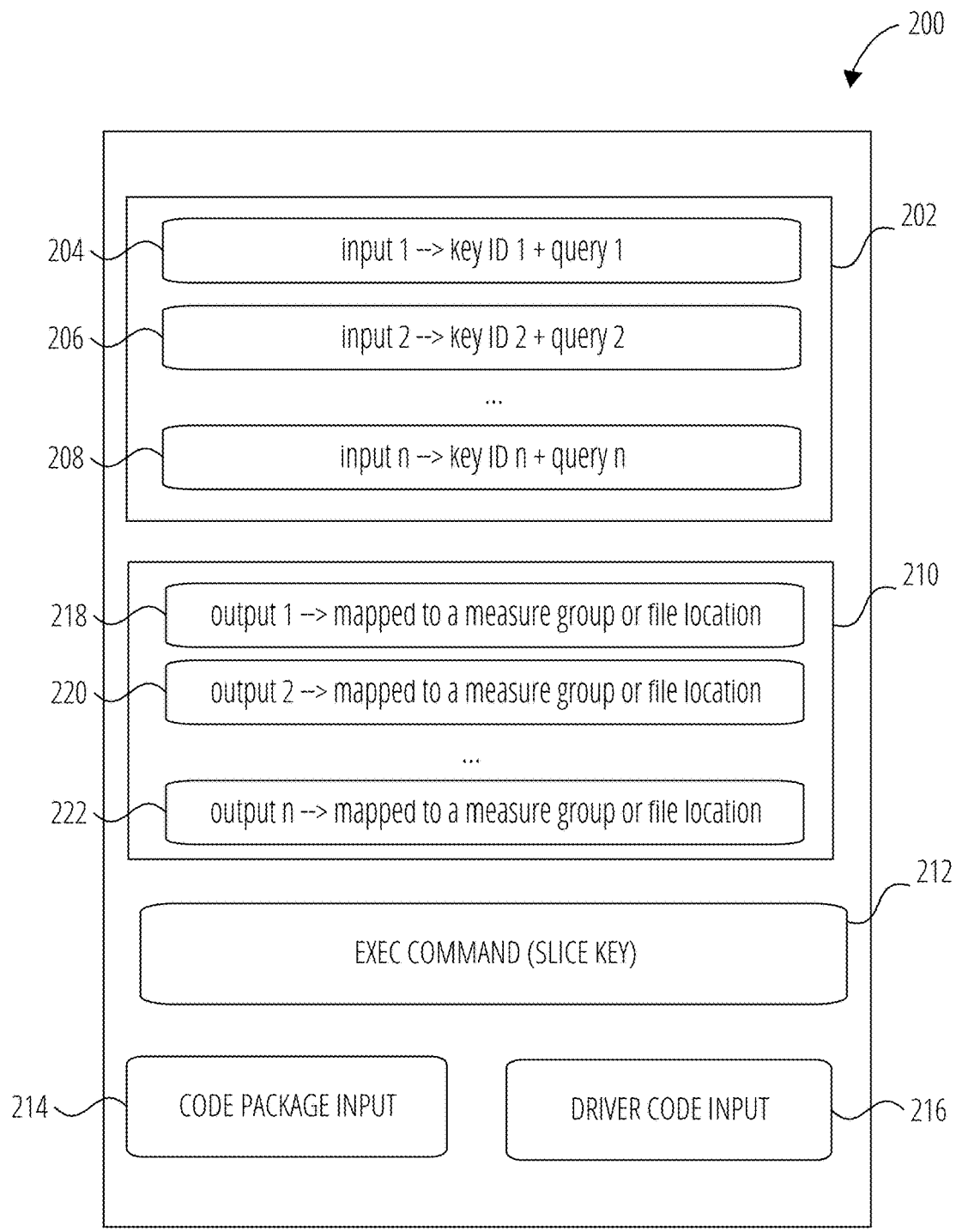
FIG. 2 illustrates a graphical user interface (GUI) of a framework for streamlining a deployment and scaling of data processing and machine learning workloads on a distributed system, according to some examples.

FIG. 2 illustrates a graphical user interface (GUI) 200 displayed for a user of a framework for streamlining a deployment and scaling of data processing and machine learning workloads on distributed systems (e.g., framework 100, or the like), according to some examples. The GUI 200 includes various user interface components, such as an input component 202, an output component 210, a command line input 212, a code package input 214, and a driver code input 216. The position of the various components displayed on GUI 200 may vary.

The user insert a declarative input including one or more inputs (e.g., input 204, input 206, input 208, or the like) at input component 202, each input including a unique key ID (e.g., key ID 1 shown in input 204, key ID 2 shown in input 206, key ID n shown in input 208, or the like) and a key value (e.g., query 1 shown in input 204, query 2 shown in input 206, query n shown in input 208, or the like). For example, an input related to sales data may include a key ID as "sales" with a key value as a query that selects relevant columns of sales data at a storage source The user may provide a query that selects a relevant measure or dimension (e.g., Select ([Version].[Version Name].[Current Working View]*[Item].[Item]) on row, ({Measure.[RCA measure]}) on column). In an example, the user provides a query that selects a measure group as the key value. The user may provide a query that selects a measure group as the key value when a storage type is a file system. In an example, the inputs are measures that may be retrieved from one or more input measure groups by querying the one or more input measure groups.

The user may insert a exec command including a slice key at the command line input 212. The slice key may include a dimension or attribute used to slice the input data. For example, an input data with a key ID of sales may be sliced by the slice key dimension region to analyze sales data specific to a particular region.

The user may write a code package and upload the code package at code package input 214 of the GUI 200. In an example, the code package (e.g., code package 154 in FIG. 1, or the like) is a bundle of code files and related resources (e.g., a Python module, or the like) that are organized and distributed together for the purpose of reuse, deployment, or distribution.

The user may upload a driver code at the driver code input 216 of the GUI 200. In an example, the driver code is a set of instructions that contains a main function that is compiled into an executable program. The driver code is the entry point into a plugin and runs as many times as the number of slices. The driver code may be provided by the user within a text block of a plugin configuration at driver code input 216. The code package (e.g., code package 154, or the like) may be referenced within the driver code. In an example, to run a plugin (e.g., a Python program, or the like), a framework (e.g., framework 100, or the like) requires one or more libraries (e.g., one or more standard Python libraries, or the like) used by the driver code or the code package (e.g., numerical Python (NumPy), TensorFlow, or the like).

After execution of the plugin, the framework may generate one or more outputs (e.g., 218, 220, 222, or the like), an output for each input. In an example, the generated one or more outputs are displayed at output component 210. Each output of the one or more outputs may be stored in a respective output measure group.

Each output may declare a measure group schema, which may be used to validate when the output is collated and stored in the respective output measure group storage. The inputs are measures from one or more input measure groups. The outputs are measures from one or more output measure groups. Each measure group can have a respective storage mechanism. The user may change the storage mechanism of an output measure group (or of an input measure group) without changing the plugin driver code or code package.

Figure 3:
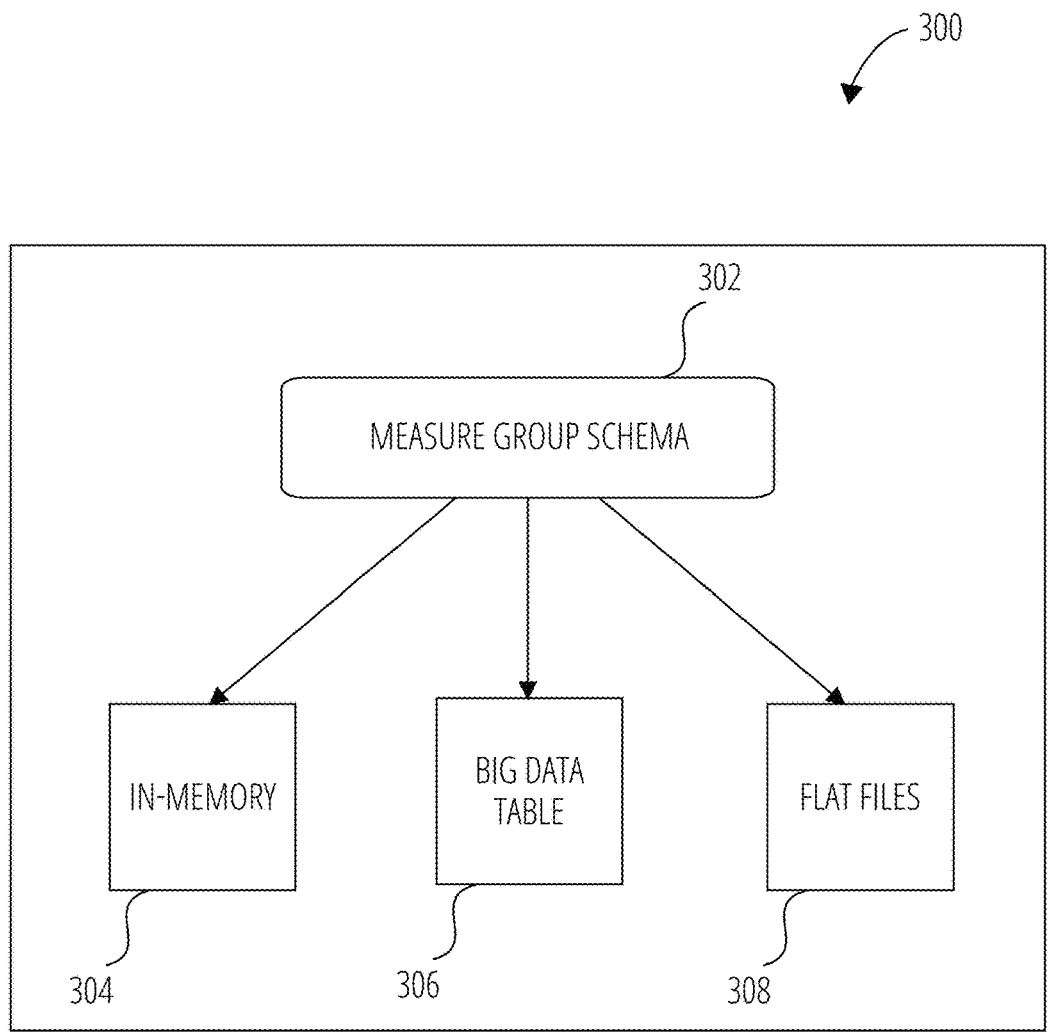
FIG. 3 is a diagram illustrating storage types for a measure group, in accordance with some examples.

FIG. 3 illustrates a diagram 300 including the types of storage for a measure group, according to some examples. The measure group schema 302 for which a user can select a type of storage amongst an in-memory storage 304, a big data table storage 306, or a flat files storage 308.

A measure group is a fact table that may follow a schema (e.g., a star schema, or the like) and store measures (e.g., business metrics, or the like). A user may create a measure group including details such as dimensions referenced by the measure group and one or more measures of the measure group. The user may group related relevant measures into a specific measure group for ease of configuration and management.

Each measure group has a measure group schema 302. A schema defines the structure and organization of data within a database or data system. The measure group schema 302 acts as a blueprint for how data is stored, organized, and related to other data. The measure group schema 302 is crucial for ensuring data consistency, integrity, and case of access. The user may select a star schema as the measure group schema 302. A star schema organizes data into a centralized fact table connected to one or more dimension tables. For example, a fact table may include sales data and fields such as sales amount, product, store, or the like. Each dimension table corresponds to a field of the fact table; for example, a product dimension table may have fields like product name, product category, product supplier, or the like.

In an example, once the user finishes a configuration of a measure group, the user may pick one of three ways of storing the underlying data: in-memory storage 304, big data table storage 306, or flat files storage 308. This flexibility allows for the freedom to pick and choose a storage mechanism that is better suited. For example, in-memory storage 304 is used for cases with frequent access to a particular measure group. Big data table storage 306 may be used for cases where the data size is humongous. Flat files storage 308 may be used in cases where the data is used in batch processing. Even when the underlying storage type is different, the user may access the data in the same way within the plugins. This improves the user experience by decoupling the data storage decisions and data processing scripts. The user may change the storage type without changing any of the plugin configurations, allowing for greater flexibility.

Figure 4:
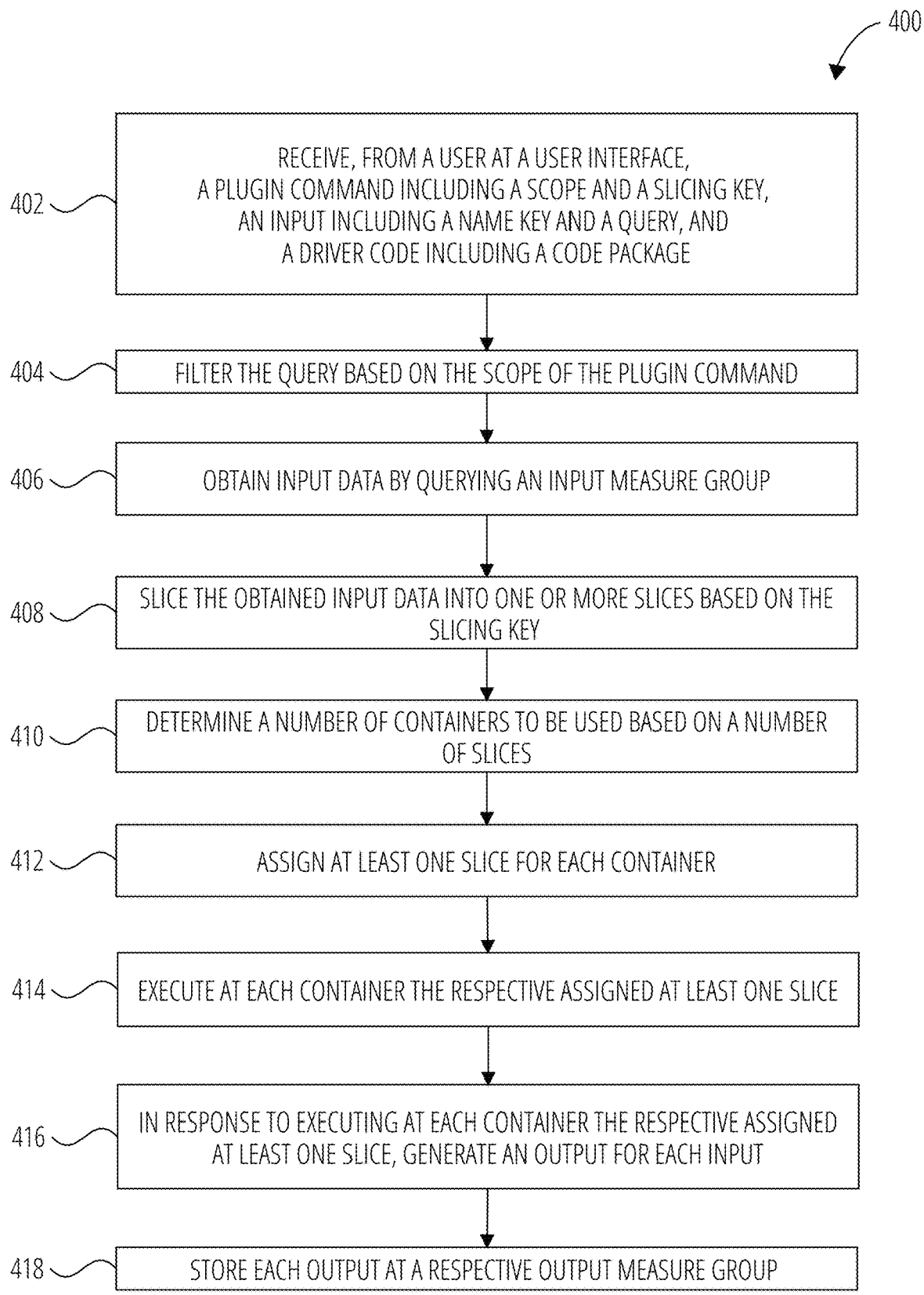
FIG. 4 is a flowchart illustrating a technique for streamlining a deployment and scaling of data processing and machine learning workloads on a distributed system, in accordance with one embodiment.

FIG. 4 illustrates a flowchart of a technique 400 for streamlining the deployment and scaling of data processing and machine learning workloads on distributed systems, according to some examples. In an example, operations of the technique 400 may be performed by processing circuitry, for example, by executing instructions stored in memory. The processing circuitry may include a processor, a system chip, or other circuitry (e.g., wiring). For example, the technique 400 may be performed by processing circuitry of a device (or one or more hardware or software components thereof), such as those illustrated and described with reference to FIG. 5.

In operation 402, technique 400 receives, from a user at a user interface, a plugin command for executing a plugin program including a scope and a slicing key, an input including a name key and a query, and a driver code including a code package. In an example, the slicing key includes at least a dimension and an attribute.

In operation 404, technique 400 filters the query based on the scope of the plugin command.

In operation 406, technique 400 obtains input data by querying an input measure group using the filtered query and the name key. In an example, the input measure group has a star schema. The user may select for the input measure group at least one of an in-memory storage, a big data table storage, or a flat files storage.

In operation 408, technique 400 slices the obtained input data into one or more slices based on the slicing key. Technique 400 may, after slicing the obtained input data into one or more slices, distribute the one or more slices across a computing cluster. In an example, before slicing the input data, the technique 400 stores the obtained input data at an interim storage.

In operation 410, technique 400 determines a number of containers to be used based on a number of slices of the one or more slices. Technique 400 may automatically determine the number of containers based on available resources on the computing cluster. In an example, determining the number of containers includes receiving from the user the number of containers in the plugin command.

In operation 412, technique 400 assigns at least one slice of the one or more slices for each container.

In operation 414, technique 400 executes at each container the respective assigned at least one slice of the one or more slices using the driver code, the code package, and a virtual environment. In an example, the virtual environment includes one or more libraries required for running the plugin program. In an example, the driver code runs as many times as the number of slices.

In operation 416, technique 400, in response to executing at each container the respective assigned at least one slice of the one or more slices, generates an output for each input. In operation 418, technique 400 stores each output at a respective output measure group. In an example, the output measure group has a star schema. The user may select for the output measure group at least one of an in-memory storage, a big data table storage, or a flat files storage.

Figure 5:
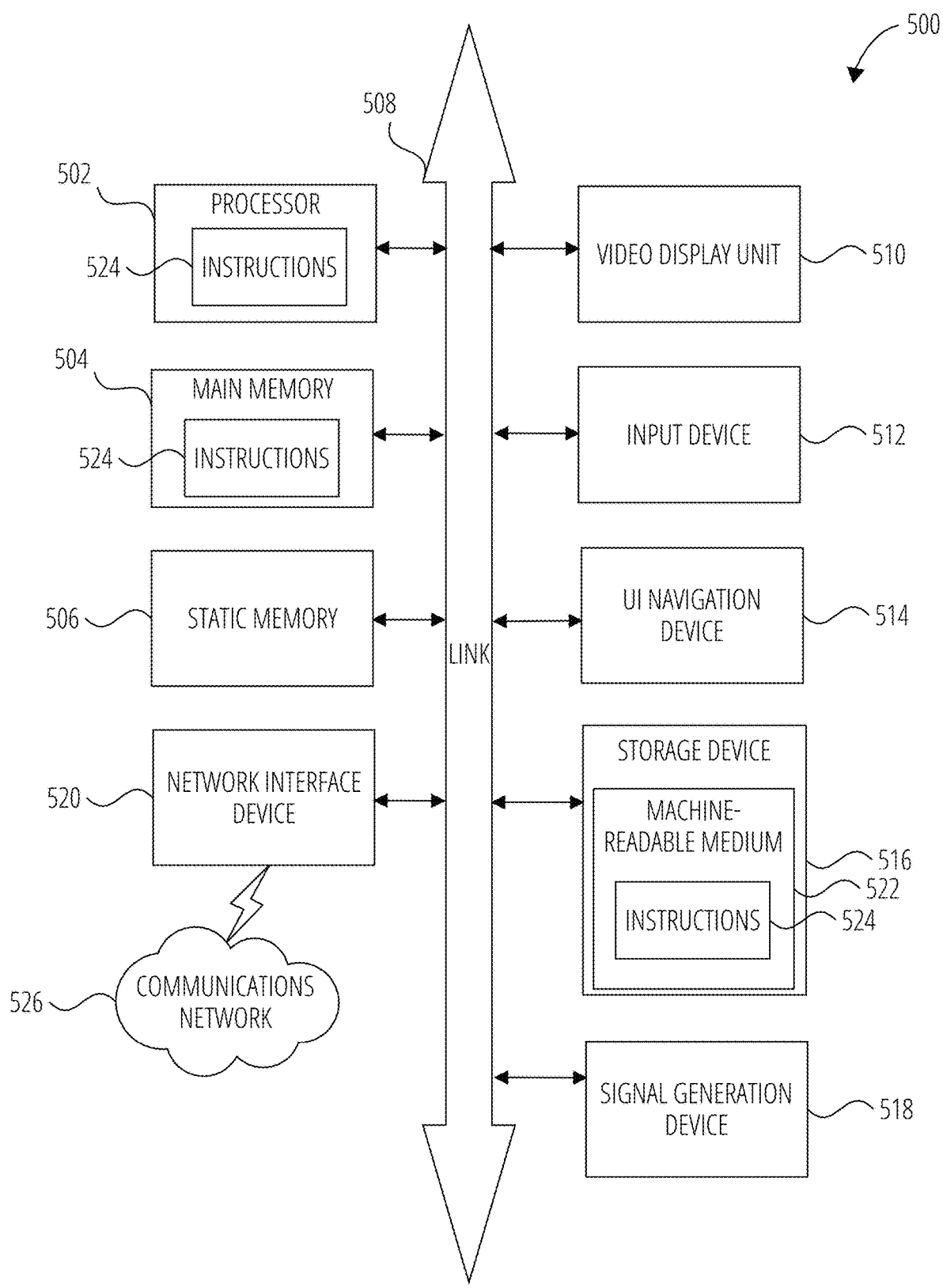
FIG. 5 is a block diagram of a machine upon which any one of the techniques described herein may be implemented, according to some examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, or the like), a main memory 504, and a static memory 506, which communicate with each other via a link 508. The computer system 500 may further include a video display unit 510, an input device 512 (e.g., a keyboard), and a user interface (UI) navigation device 514 (e.g., a mouse).

In one embodiment, the video display unit 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, the static memory 506, and/or within the processor 502 during execution thereof by the computer system 500, with the main memory 504, the static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding, or carrying instructions for execution by the machine and that causes the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications network 526 using a transmission medium via the network interface device 520 utilizing any one of a number of well-known transfer protocols (e.g., HTTP). Examples of communication networks include a Local Area Network (LAN), a Wide Area Network (WAN), the Internet, mobile telephone networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: receiving from a user at a user interface: a plugin command for executing a plugin program including a scope and a slicing key; an input including a name key and a query; and a driver code including a code package; filtering the query based on the scope of the plugin command; obtaining input data by querying an input measure group using the filtered query and the name key; slicing the obtained input data into one or more slices based on the slicing key; determining a number of containers to be used based on a number of slices of the one or more slices; assigning at least one slice of the one or more slices for each container; executing at each container the respective assigned at least one slice of the one or more slices using the driver code, the code package, and a virtual environment; in response to executing at each container the respective assigned at least one slice of the one or more slices, generating an output for each input; and storing each output at a respective output measure group.

In Example 2, the subject matter of Example 1 includes, wherein the slicing key includes at least a dimension and an attribute.

In Example 3, the subject matter of Examples 1-2 includes, wherein each input measure group and each output measure group have a star schema.

In Example 4, the subject matter of Examples 1-3 includes, wherein the user selects for each input measure group and for each output measure group at least one of an in-memory storage, a big data table storage, or a flat files storage.

In Example 5, the subject matter of Examples 1-4 includes, after slicing the obtained input data into one or more slices, distributing the one or more slices across a computing cluster; wherein determining the number of containers includes automatically determining the number of containers based on available resources on the computing cluster.

In Example 6, the subject matter of Examples 1-5 includes, wherein determining the number of containers includes receiving from the user the number of containers in the plugin command.

In Example 7, the subject matter of Examples 1-6 includes, wherein the virtual environment includes one or more libraries required for running the plugin program.

In Example 8, the subject matter of Examples 1-7 includes, wherein the driver code runs as many times as the number of slices.

In Example 9, the subject matter of Examples 1-8 includes, before slicing the input data, storing the obtained input data at an interim storage.

Example 10 is a system for streamlining a deployment and scaling of data processing and machine learning workloads on a distributed system, the system comprising: at least one processor; and a memory including instructions that, when executed by the at least one processor, cause the at least one processor to perform operations to: receive from a user at a user interface: a plugin command for executing a plugin program including a scope and a slicing key; an input including a name key and a query; and a driver code including a code package; filter the query based on the scope of the plugin command; obtain input data by querying an input measure group using the filtered query and the name key; slice the obtained input data into one or more slices based on the slicing key; determine a number of containers to be used based on a number of slices of the one or more slices; assign at least one slice of the one or more slices for each container; execute at each container the respective assigned at least one slice of the one or more slices using the driver code, the code package, and a virtual environment; in response to the execution at each container the respective assigned at least one slice of the one or more slices, generate an output for each input; and store each output at a respective output measure group.

In Example 11, the subject matter of Example 10 includes, wherein each input measure group and each output measure group have a star schema.

In Example 12, the subject matter of Examples 10-11 includes, wherein the user selects for each input measure group and for each output measure group at least one of an in-memory storage, a big data table storage, or a flat files storage.

In Example 13, the subject matter of Examples 10-12 includes, after the slicing of the obtained input data into one or more slices, distribute the one or more slices across a computing cluster; wherein determine of the number of containers includes automatically determine the number of containers based on available resources on the computing cluster.

In Example 14, the subject matter of Examples 10-13 includes, wherein determine the number of containers includes receive from the user the number of containers in the plugin command.

In Example 15, the subject matter of Examples 10-14 includes, wherein the virtual environment includes one or more libraries required for running the plugin program.

In Example 16, the subject matter of Examples 10-15 includes, wherein the driver code runs as many times as the number of slices.

Example 17 is at least one non-transitory machine-readable medium including instructions for streamlining a deployment and scaling of data processing and machine learning workloads on a distributed system that, when executed by at least one processor, cause the at least one processor to perform operations to: receive from a user at a user interface: a plugin command for executing a plugin program including a scope and a slicing key; an input including a name key and a query; and a driver code including a code package; filter the query based on the scope of the plugin command; obtain input data by querying an input measure group using the filtered query and the name key; slice the obtained input data into one or more slices based on the slicing key; determine a number of containers to be used based on a number of slices of the one or more slices; assign at least one slice of the one or more slices for each container; execute at each container the respective assigned at least one slice of the one or more slices using the driver code, the code package, and a virtual environment; in response to the execution at each container the respective assigned at least one slice of the one or more slices, generate an output for each input; and store each output at a respective output measure group.

In Example 18, the subject matter of Example 17 includes, wherein each input measure group and each output measure group have a star schema.

In Example 19, the subject matter of Examples 17-18 includes, wherein the user selects for each input measure group and for each output measure group at least one of an in-memory storage, a big data table storage, or a flat files storage.

In Example 20, the subject matter of Examples 17-19 includes, after the slicing of the obtained input data into one or more slices, distribute the one or more slices across a computing cluster; wherein determine of the number of containers includes automatically determine the number of containers based on available resources on the computing cluster.

In Example 21, the subject matter of Examples 17-20 includes, wherein the virtual environment includes one or more libraries required for running the plugin program.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method comprising:
  receiving from a user at a user interface:
    a plugin command for executing a plugin program including a scope and a slicing key;
    an input including a name key and a query; and
    a driver code including a code package;
  filtering the query based on the scope of the plugin command;
  obtaining input data by querying an input measure group using the filtered query and the name key;
  slicing the obtained input data into one or more slices based on the slicing key;
  determining a number of containers to be used based on a number of slices of the one or more slices;
  assigning at least one slice of the one or more slices for each container;
  executing at each container the respective assigned at least one slice of the one or more slices using the driver code, the code package, and a virtual environment;
  in response to executing at each container the respective assigned at least one slice of the one or more slices, generating an output for each input; and
  storing each output at a respective output measure group.

2. The method of claim 1, wherein the slicing key includes at least a dimension and an attribute.

3. The method of claim 1, wherein each input measure group and each output measure group have a star schema.

4. The method of claim 1, wherein the user selects for each input measure group and for each output measure group at least one of an in-memory storage, a big data table storage, or a flat files storage.

5. The method of claim 1, further comprising:
  after slicing the obtained input data into one or more slices, distributing the one or more slices across a computing cluster;
  wherein determining the number of containers includes automatically determining the number of containers based on available resources on the computing cluster.

6. The method of claim 1, wherein determining the number of containers includes receiving from the user the number of containers in the plugin command.

7. The method of claim 1, wherein the virtual environment includes one or more libraries required for running the plugin program.

8. The method of claim 1, wherein the driver code runs as many times as the number of slices.

9. The method of claim 1, further comprising:
  before slicing the input data, storing the obtained input data at an interim storage.

10. A system for streamlining a deployment and scaling of data processing and machine learning workloads on a distributed system, the system comprising:
  at least one processor; and
  a memory including instructions that, when executed by the at least one processor, cause the at least one processor to perform operations to:
  receive from a user at a user interface:
    a plugin command for executing a plugin program including a scope and a slicing key;
    an input including a name key and a query; and
    a driver code including a code package;

filter the query based on the scope of the plugin command;
obtain input data by querying an input measure group using the filtered query and the name key;
slice the obtained input data into one or more slices based on the slicing key;
determine a number of containers to be used based on a number of slices of the one or more slices;
assign at least one slice of the one or more slices for each container;
execute at each container the respective assigned at least one slice of the one or more slices using the driver code, the code package, and a virtual environment;
in response to the execution at each container the respective assigned at least one slice of the one or more slices, generate an output for each input; and
store each output at a respective output measure group.

11. The system of claim 10, wherein each input measure group and each output measure group have a star schema.

12. The system of claim 10, wherein the user selects for each input measure group and for each output measure group at least one of an in-memory storage, a big data table storage, or a flat files storage.

13. The system of claim 10, further comprising:
after the slicing of the obtained input data into one or more slices, distribute the one or more slices across a computing cluster;
wherein determine of the number of containers includes automatically determine the number of containers based on available resources on the computing cluster.

14. The system of claim 10, wherein determine the number of containers includes receive from the user the number of containers in the plugin command.

15. The system of claim 10, wherein the virtual environment includes one or more libraries required for running the plugin program.

16. The system of claim 10, wherein the driver code runs as many times as the number of slices.

17. At least one non-transitory machine-readable medium including instructions for streamlining a deployment and scaling of data processing and machine learning workloads on a distributed system that, when executed by at least one processor, cause the at least one processor to perform operations to:
receive from a user at a user interface:
 a plugin command for executing a plugin program including a scope and a slicing key;
 an input including a name key and a query; and
 a driver code including a code package;
filter the query based on the scope of the plugin command;
obtain input data by querying an input measure group using the filtered query and the name key;
slice the obtained input data into one or more slices based on the slicing key;
determine a number of containers to be used based on a number of slices of the one or more slices;
assign at least one slice of the one or more slices for each container;
execute at each container the respective assigned at least one slice of the one or more slices using the driver code, the code package, and a virtual environment;
in response to the execution at each container the respective assigned at least one slice of the one or more slices, generate an output for each input; and
store each output at a respective output measure group.

18. The at least one non-transitory machine-readable medium of claim 17, wherein each input measure group and each output measure group have a star schema.

19. The at least one non-transitory machine-readable medium of claim 17, wherein the user selects for each input measure group and for each output measure group at least one of an in-memory storage, a big data table storage, or a flat files storage.

20. The at least one non-transitory machine-readable medium of claim 17, further comprising:
after the slicing of the obtained input data into one or more slices, distribute the one or more slices across a computing cluster;
wherein determine of the number of containers includes automatically determine the number of containers based on available resources on the computing cluster.

21. The at least one non-transitory machine-readable medium of claim 17, wherein the virtual environment includes one or more libraries required for running the plugin program.

* * * * *

UNITED STATES PATENT AND TRADEMARK OFFICE
CERTIFICATE OF CORRECTION

PATENT NO. : 12,282,759 B1  
APPLICATION NO. : 18/903570  
DATED : April 22, 2025  
INVENTOR(S) : Vanga et al.

Page 1 of 1

It is certified that error appears in the above-identified patent and that said Letters Patent is hereby corrected as shown below:

On the Title Page

Item (71), in "Applicant:", in Column 1, Line 1, delete "o9Solutions," and insert --o9 Solutions,-- therefor Signed and Sealed this  
Tenth Day of February, 2026

John A. Squires  
*Director of the United States Patent and Trademark Office*